WILLIAM STARKEY.
Improvement in Potato Diggers.

No. 125,094.  Patented March 26, 1872.

Witnesses:
Jacob E. Schiedt
Chas. E. Plummer

Inventor:
William Starkey
by John A. Diedersheim
atty.

125,094

UNITED STATES PATENT OFFICE.

WILLIAM STARKEY, OF CEDARVILLE, NEW JERSEY, ASSIGNOR TO HIMSELF AND ROBERT M. BATEMAN, OF SAME PLACE.

IMPROVEMENT IN POTATO-DIGGERS.

Specification forming part of Letters Patent No. 125,094, dated March 26, 1872.

*To all whom it may concern:*

Be it known that I, WILLIAM STARKEY, of Cedarville, in the county of Cumberland and State of New Jersey, have invented a new and useful Device for Digging Sweet Potatoes, Turnips, &c., and I do hereby declare the following to be a clear and exact description of the nature thereof, sufficient to enable others skilled in the art to which my invention appertains to fully understand and use the same, reference being had to the accompanying drawing making part of this specification, in which—

Figure 1:
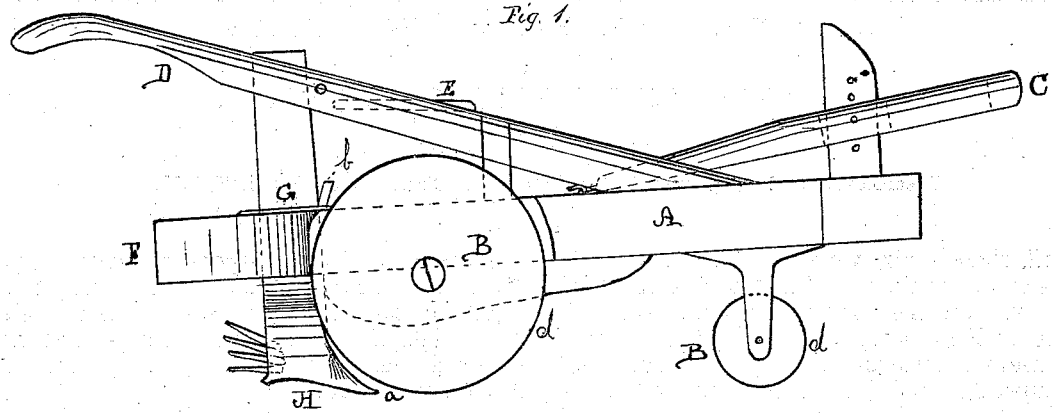
Figure 2:
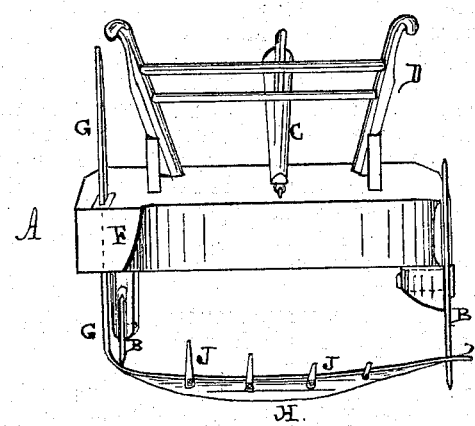
Figure 3:
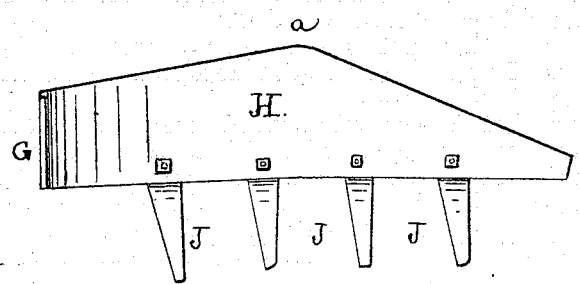
Figure 4:
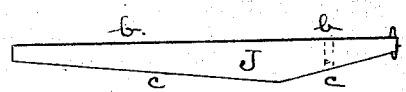

Figure 1 is a side view. Fig. 2 is a perspective view from the rear. Fig. 3 is a top view of the shovel and fingers. Fig. 4 is a detached view of one of the fingers.

Similar letters of reference indicate corresponding parts in the several figures.

My invention relates to a device for digging sweet potatoes, turnips, &c., and consists of fingers of peculiar construction, and made removable and reversible, whereby the vegetables may be thrown to the side or to the rear of the digger. It also consists in the combination of parts, as will be set forth.

Referring to the drawing, A may represent a frame or body mounted on wheels B B, and provided with a draft-pole C, handles D, and, if desired, with a seat, E. The body A has at its rear an extension piece, F, which is slotted or grooved vertically, and through it passes the shank G of the shovel H. This shovel has a digging-edge, $a$, and its shank is turned up at one side so that the other side is free, for purposes to be explained. By means of the shank the shovel is secured to the body, and is permitted to be raised and lowered relatively to the size of the hills containing the vegetables to be dug. The shank will be held in position by means of a key, $g$, or other fastenings, suitably applied. J represents a series of fingers which are removably secured to the shovel H, and are so arranged thereon that they will stand highest on the shank side and lowest on the free side of said shovel. One face, $b$, of the fingers will be right lined, and the other face $c$ will be angular or sloping, so that as either face of said fingers is above there will be provided a means for throwing the vegetables to the side or rear of the shovel. The wheels B B will have cutting-edges or cutters $d$ thereon, for cutting the plants on the side of the hills.

In operation, the horses walk on the sides of the hills and draw the device. The wheels will cut the plants, and the shovels penetrate the hills, throw up the earth and vegetables, and convey the former to the rear, where it will drop between the fingers. If the face $c$ of the fingers is uppermost, the vegetables will pass to the rear of the digger, since the fingers incline longitudinally toward the ground, but when the face $b$ is above, the fingers are longitudinally elevated and the transverse inclination of said fingers cause the vegetables to pass to the free side of the shovel, where they drop on the ground. The fingers may have studs or teats to enter openings or notches in the shovel, and also holes for the passage of bolts or fastenings for securing said fingers to the shovel. By causing the fingers to occupy longitudinal positions upward or downward, the vegetables may be thrown to the rear of the device or at the side thereof, in the manner stated. The wheels may be arranged diagonally, so that provision is made for properly drawing the digger over uneven ground.

Having thus described my invention, what I claim as new, and desire to secure by Letters Patent, is—

1. The shovel provided with the removable and reversible teeth J $b$ $c$, substantially as and for the purpose described.

2. A digger consisting of the body A, cutting-wheels B, adjustable shovel G, and reversible teeth J, combined and operating as described.

The above signed by me this 1st day of December, 1871.

WM. STARKEY.

Witnesses:
JOHN A. WIEDERSHEIM,
J. W. HAMPTON, Jr.